United States Patent [19]
Harada et al.

[11] Patent Number: 5,169,245
[45] Date of Patent: Dec. 8, 1992

[54] THRUST BEARING DEVICE

[75] Inventors: Naoto Harada; Shuji Sekine, both of Yokohama, Japan

[73] Assignee: Jidosha Denki Kogyo K.K., Kanagawa, Japan

[21] Appl. No.: 699,831

[22] Filed: May 14, 1991

[30] Foreign Application Priority Data

May 14, 1990 [JP] Japan .............................. 2-49949[U]

[51] Int. Cl.[5] .............................................. F16C 19/50
[52] U.S. Cl. ................................. 384/610; 384/218; 384/425; 384/611
[58] Field of Search ............... 384/610, 218, 611, 425, 384/612, 615

[56] References Cited

U.S. PATENT DOCUMENTS

| | | | |
|---|---|---|---|
| 1,469,424 | 10/1923 | McQuaid | 384/610 |
| 2,233,525 | 3/1941 | Guptail | 384/425 |
| 3,311,433 | 3/1967 | Graham et al. | 384/610 |
| 4,050,130 | 9/1977 | Pitner | 384/425 |

Primary Examiner—Lenard A. Footland
Attorney, Agent, or Firm—Sughrue, Mion, Zinn, Macpeak & Seas

[57] ABSTRACT

A thrust bearing device for a motor comprises a housing of the motor, a thrust plate disposed in the housing and in contact with an end of a motor shaft, a spring for energizing the motor shaft through the thrust plate, and the housing is formed with a stepped portion for restricting movement of the thrust plate within a predetermined small range. According to this invention, it is possible to improve the durability and the reliability of the motor.

3 Claims, 2 Drawing Sheets

THRUST BEARING DEVICE

BACKGROUND OF THE INVENTION

1. Field of the Invention

This invention relates to a thrust bearing device used for receiving thrust of a motor shaft, in a motor provided with a worm of a reduction gear on the motor shaft, for example.

2. Description of the Prior Art

Heretofore, there has been used a thrust bearing device for a motor as shown in FIG. 3, for example.

A motor shaft 101 of a motor is provided with an armature wound with wire at one end thereof not shown in FIG. 3, and is formed with a worm 101a at the middle part thereof forming a reduction gear together with a worm wheel. And another end of the motor shaft 101 is supported rotably by a bush 103 disposed in a housing 102 of the motor.

In the housing 102, a thrust plate 104 to be in contact with another end of the motor shaft 101 and a spring 105 to energize the motor shaft 101 in its axial direction through the thrust plate 104 are provided as a thrust bearing device for the motor so as to receive thrust of the motor shaft 101 caused by working of the motor.

However, in the aforementioned conventional thrust bearing device of the motor, the motor shaft 101 is allowed to move until the spring 105 is compressed entirely when thrust load is applied on it, and the motor shaft 101 is apt to become rickety since it is movable extensively. And the movable range of the thrust plate 104 with the motor shaft 101 is wide, and worse still the thrust plate 104 is not always compressed uniformly, therefore the thrust plate 104 is apt to be inclined against the center line of the spring 105, and there is a problem since the spring 105 and the thrust plate 104 are waiting in durability and reliability.

SUMMARY OF THE INVENTION

This invention is made noticing the above mentioned problem of the prior art, it is an object to provide a thrust bearing device for a motor which is good in the movement at the time of receiving thrust load and possible to improve the durability and the reliability of the motor.

The construction of the thrust bearing device according to this invention is characterized in that it comprises a housing of the motor, a thrust plate disposed in the housing of the motor and in contact with an end of a motor shaft of the motor, a spring for energizing the motor shaft in its axial direction through the thrust plate, and the housing is formed with a stepped portion on the inner periphery thereof surrounding the spring for restricting movement of the thrust plate within a predetermined range, in order to solve the problem of the conventional thrust bearing device described above.

In the thrust bearing device according to this invention, the movement of the motor shaft in restricted in a small range without compressing the spring throughly since the thrust plate is moved by thrust load as compressing the spring and comes in contact with the stepped portion formed on the housing of the motor at the time of receiving the thrust load. When the thrust load is released the motor shaft is energized again in its axial direction by pressing back the motor shaft through the thrust plate according to elasticity of the spring.

DESCRIPTION OF THE PREFERRED EMBODIMENT

An embodiment of this invention will be explained below in reference to FIG. 1 and FIG. 2.

Figure 2:
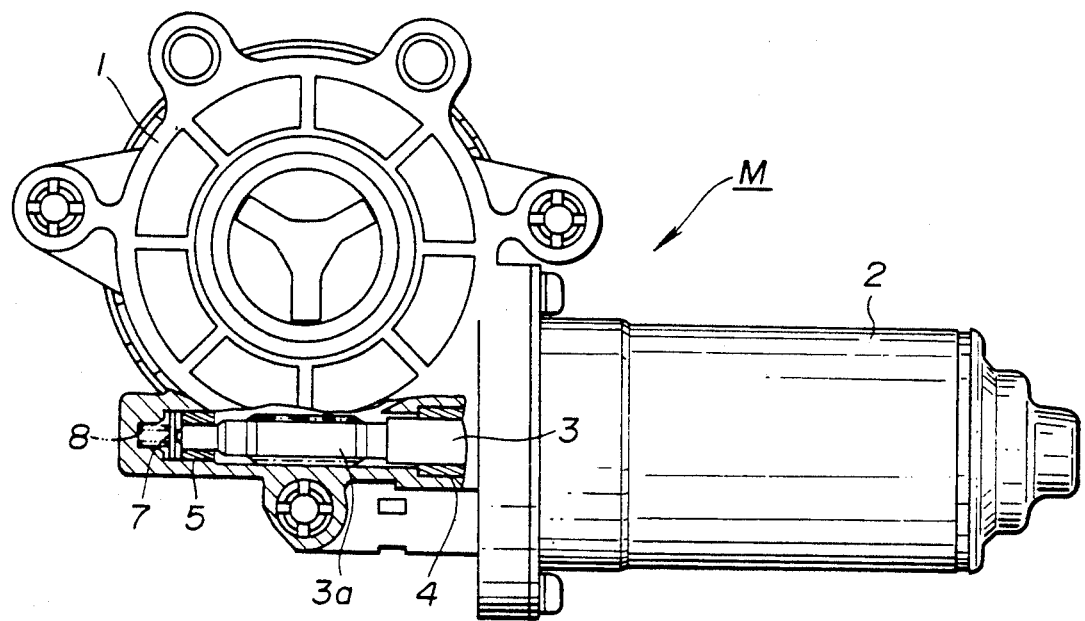
FIG. 2 is a fragmentary sectional side view illustrating the whole body of the power window motor shown in FIG. 1.

In this embodiment, a case is exemplified in which a thrust bearing device according to this invention is applied to a power window motor M for motor vehicles shown in FIG. 2.

The power window motor M is formed by combining a motor yoke 2 with a gear housing 1 which forms a part of the housing of the motor M and includes a reduction gear and so on. A motor 3 is provided with an armature wound with wire at one end thereof contained in the motor yoke 2, and has a worm 3a forming the reduction gear together with a worm wheel. And the motor shaft 3 is supported rotatably by bushes 4 and 5 disposed in the gear housing 1, and is provided with a steel ball 6 on another end thereof.

Figure 1:
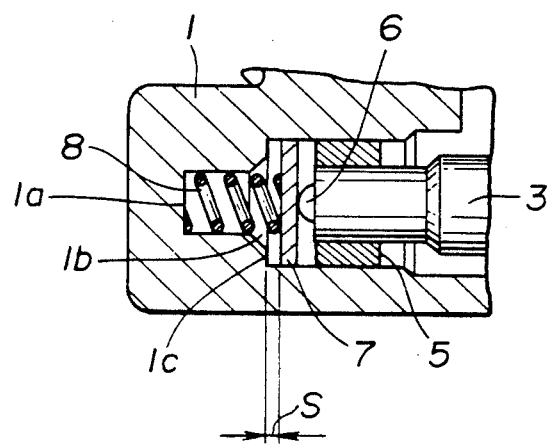
FIG. 1 is a sectional view of the power window motor illustrating the thrust bearing device according to an embodiment of this invention.
Figure 3:
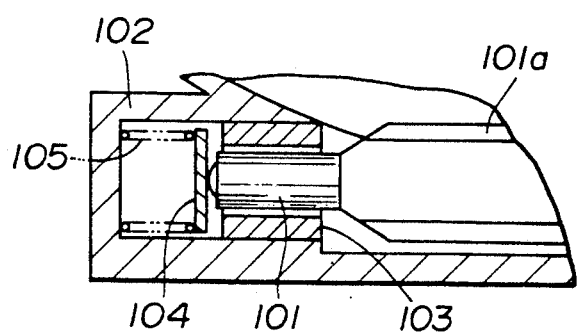
FIG. 3 is a sectional view of the conventional thrust bearing device for a motor.

In the gear housing 1 on the side of another end of the motor shaft 3, a thrust plate 7 in contact with another end (steel ball 6) of the motor shaft 3 and a coil spring 8 to energize the motor shaft 3 through the thrust plate 7 in its axial direction are housed as shown in FIG. 1. The gear housing 1 is formed with a funnel-shaped portion 1b ranging from a spring hole 1a to be contained with the spring 8 and spreading gradually toward the motor shaft 3 and formed with a stepped portion 1c opposed with the thrust plate 7 on the outside of an opening of the funnel-shaped portion 1b. Namely, the stepped portion 1c is formed over the whole circumference of the spring 8 on the gear housing 1 in one body.

And a gap S is formed the stepped portion 1c and the thrust plate 7, which is smaller than compressive length of the spring 8 in the assembled state.

In the thrust bearing device afore-mentioned above, the thrust plate 7 moves is a range as much as the gap S as compressing the spring 8 by receiving thrust load of the motor shaft 3 in the leftward direction in the figures at the time of working of the motor M, and the movement of the motor shaft 3 is restricted by contacting the thrust plate 7 with the stepped portion 1c of the gear housing 1. In this time, the spring 8 is compressed without interfering with the stepped portion 1c because of the funnel-shaped portion 1b.

Namely, in the aforementioned thrust bearing device, the motor shaft 3 never moves widely and is never rattled because the movement of the motor shaft 3 is restricted in a small range as much as the gap S without compressing the spring 8 throughly. And because the movable range of the thrust plate 7 is also small, the thrust plate 7 is maintained perpendicularly to the center line of the spring 8, and the thrust plate 7 and the spring 8 are kept to move smoothly in the gear housing 1 of the motor M.

And when the thrust load is released, the motor shaft 3 is forced back in the rightward direction in the figure through the turust plate 7 by the elasticity of the spring 8 and continued to be energized as before.

As mentioned above, the turust bearing device according to this invention comprises a housing of a motor, a thrust plate disposed in the housing of the motor and in contact with an end of a motor shaft of the motor, a spring for energizing the motor shaft in its axial direction through the thrust plate, and the housing is formed with a stepped portion on the inner periphery thereof surrounding the spring for restricting movement of the thrust plate within a predetermined range. Therefore, it is possible to restrict the movement of the motor shaft in a small range at the same time of maintaining the function to receive the thrust load, thereby the motor shaft is never rattled and the thrust plate is never inclined and these members are possible to move smoothly in the housing and it is possible to improve the durability and the reliability of the motor. Furthermore, the number of parts and the assembling steps of the motor are never increased, and it is easy to assemble because the stepped portion is formed in the housing of the motor in one body.

What is claimed is:

1. A thrust bearing device for a motor comprising:
   a housing of the motor;
   a thrust plate disposed in said houosing of the motor and in contact with an end of a motor shaft of the motor;
   a spring for energizing the motor shaft in its axial direction through the thrust plate; and
   said housing being formed with a stepped portion on the inner periphery thereof surrounding said spring for restricting movement of the thrust plate within a predetermined range.

2. A thrust bearing device for a motor as set forth in claim 1, wherein the thrust plate is in contact with the end of the motor shaft through a steel ball.

3. A thrust bearing device for a motor as set forth in claim 1, wherein said spring is a coil spring.

* * * * *